United States Patent [19]

Downey

[11] 4,341,747

[45] Jul. 27, 1982

[54] PROCESS OF REMOVING NITROGEN OXIDES FROM GASEOUS MIXTURES

[75] Inventor: Gale D. Downey, Pennington, N.J.

[73] Assignee: FMC Corporation, Philadelphia, Pa.

[21] Appl. No.: 933,694

[22] Filed: Aug. 15, 1978

[51] Int. Cl.³ .............................................. C01B 21/40
[52] U.S. Cl. ..................................... 423/235; 423/393
[58] Field of Search ....................... 423/235, 393, 395; 55/68

[56] References Cited

U.S. PATENT DOCUMENTS 3,991,167  11/1976  Depommier ......................... 423/393

FOREIGN PATENT DOCUMENTS 48-15766  2/1973  Japan ................................... 423/235

Primary Examiner—G. O. Peters
Attorney, Agent, or Firm—Robert D. Jackson; Frank Ianno

[57] ABSTRACT

Nitrogen oxides are removed from gaseous mixtures by treatment with an aqueous solution of nitric acid having a concentration by weight from about 35% to about 58% and containing by weight at least 0.001% but less than 25% of hydrogen peroxide whereby the nitrogen oxides are converted to nitric acid.

3 Claims, No Drawings

PROCESS OF REMOVING NITROGEN OXIDES FROM GASEOUS MIXTURES

This invention relates to the removal of nitrogen oxides from gaseous mixtures, particularly waste gases.

The treatment of gaseous wastes prior to their release into the atmosphere has long engaged the attention of the chemical industry. Over the years a great deal of effort has been directed at minimizing these waste products both for reasons of economy and to avoid atmospheric pollution. Recently, however, this effort has intensified as the industry seeks to develop new waste treatment measures which have minimal environmental impact.

One class of atmospheric pollutants which has been the subject of extensive investigation, are nitrogen oxides. These gaseous waste products can be found both in the tail gases discharged from plants manufacturing nitric acid and in the residual gases discharged from plants which use nitric acid as an ingredient. In a conventional plant for producing nitric acid by the oxidation of ammonia, the exhaust gases contain about 1000 parts per million to 2000 parts per million of total nitrogen oxides. This considerably exceeds the 200 parts per million maximum in the non-diluted tail gases recommended and/or required by the environmental agencies of various countries.

Among the prior art proposals for controlling nitrogen oxide emissions in waste gases is to treat them with a combination of hydrogen peroxide and nitric acid. The purpose of the nitric acid is to convert any oxidatively resistant nitric oxide (NO) to the higher valent nitrogen dioxide ($NO_2$) and nitrogen peroxide ($NO_2O_3$) forms which are readily oxidized to nitric acid by the hydrogen peroxide. The advantage to this approach is that it is non-polluting, adding ultimately only water and oxygen to the system.

A description of the nitric acid/hydrogen peroxide treatment of nitrogen oxides, is given in Japanese Pat. No. 48-15766 granted Feb. 28, 1973. According to this document, NO and $NO_2$ are removed from a waste gas by contacting it with an aqueous solution containing 0.001–20% by weight of hydrogen peroxide and 0.5 to 30% by weight of nitric acid. A variant of the technique is a two stage treatment in which the nitrogen oxides are first contacted with nitric acid to oxidize the NO and the oxidized gases then subjected to the action of hydrogen peroxide to form nitric acid. Details of the two stage treatment are set forth in U.S. Pat. No. 3,991,167 granted Nov. 9, 1976.

Although these processes are capable of substantially reducing high level $NO_x$ emissions, a comparable degree of reduction is not obtained when treating low level $NO_x$ emissions. For instance, a modern nitric acid plant utilizing the latest state of the art construction can achieve $NO_x$ emissions of about 500 parts per million. Such levels still exceed many of the environmentally imposed $NO_x$ standards yet are too dilute for effective treatment by the aforediscussed prior art processes. Manifestly, this area of $NO_x$ abatement technology is amenable to further development and improvement.

In accordance with the present invention, nitrogen oxides can be removed from a gaseous mixture by contacting the mixture with an aqueous solution of nitric acid having a concentration by weight from about 35% to about 58% and containing by weight at least 0.001% of hydrogen peroxide whereby the nitrogen oxides are converted to nitric acid.

The process of the invention is carried out by passing the effluent gas containing $NO_x$ through the aqueous solution of nitric acid and hydrogen peroxide. Preferred concentration ranges in the scrubbing solution for the nitric acid are 40% to 55% by weight. The upper range of the hydrogen peroxide is not critical but is desirably about 25% by weight and preferably about 0.4% to about 2.0% by weight.

Contact times are not critical but are relatively short, for effecting substantial reduction in total $NO_x$ emission. For instance, contact times of less than 2.5 seconds gave at least 60% oxidation of NO and a 35% decrease in combined $NO_x$ levels. Consumption of hydrogen peroxide is less than about two pounds per pound of $NO_x$ removed.

The process of the invention provides rapid abatement of $NO_x$ under conditions where both the required concentration of $H_2O_2$ and the rate of $H_2O_2$ decomposition are minimized. This improves the efficiency of using $H_2O_2$ to oxidize nitrogen oxides to nitric acid. The precise composition of the $NO_x$ emissions does not limit the use of this process, as it often does for other wet scrubbing processes. Emissions consisting predominantly of NO, or predominantly $NO_2$, or any mixture of these two species are all treated equally effectively. Additionally no toxic undesirable by-products are generated in the practice of this process and in many manufacturing processes, a useful by-product, namely nitric acid, would be produced by the implementation of this process.

In contrast to many other wet scrubbing oxidation processes, the level of $NO_x$ emissions does not affect the efficiency of the herein process, as emissions from a few parts per million to several thousand parts per million can be effectively abated. For instance, the process herein is effective in reducing $NO_x$ emissions at starting levels less than 400 parts per million and brings them within currently acceptable environmental standards. Moreover, the degree of $NO_x$ abatement is at least double that of the mixture of $H_2O_2$ and dilute nitric acid or the sequential treatment using nitric acid in a first stage and hydrogen peroxide in a second stage as taught in the prior art.

The chemistry of the herein process involves dissolution and oxidation of NO by nitric acid to form $HNO_2$ and $N_2O_4$ by reactions:

$$HNO_3 + 2NO + H_2O \rightleftharpoons 3HNO_2 \tag{1}$$

$$HNO_3 + HNO_2 \rightleftharpoons N_2O_4 + H_2O \tag{2}$$

Oxidation, in place of both $N_2O_4$ and HONO by $H_2O_2$ and pernitric acid (in equilibrium with $H_2O_2$ and $HNO_3$ by reaction $H_2O_2 + HNO_3 \rightleftharpoons HNO_4 \cdot H_2O$) yields nitric acid by reactions:

$$HONO + H_2O_2 \rightarrow HNO_3 + H_2O \tag{3}$$

$$HONO + HNO_4 \rightarrow 2HNO_3 \tag{4}$$

$$N_2O_4 + H_2O_2 \rightarrow 2HNO_3 \tag{5}$$

$$N_2O_4 + HNO_4 + H_2O \rightarrow 3HNO_3 \tag{6}$$

Concentrations above 35% $HNO_3$ are required to initiate reactions (1) and (2), while only a small amount of $H_2O_2$ is necessary for reactions (3), (4), (5), and (6) to proceed in acidic solutions. These mixtures of $H_2O_2$ and $HNO_3$ present no safety hazard as long as the mixture contains less than about 58% $HNO_3$ and less than about 25% $H_2O_2$. This prevents formation of large concentrations of $HNO_4$, which if decomposed rapidly can liberate large quantities of heat. In this process $H_2O_2$ use is minimized as only low concentrations are needed in the scrubbing solution, which being acidic also stabilizes $H_2O_2$ at these low concentrations.

The process of the invention can be used in nitric acid absorber towers, in extended absorbers for nitric acid plants, in gas scrubbers, and in manufacturing batch and process steams which contain high strength nitric acid. Current practice in nitric acid absorber towers is to use a dilute nitric acid solution in a counter-current flow to absorb nitrogen oxides which are produced by the oxidation of ammonia. This dilute solution is formed by mixing a small fraction of bleached product acid (at least 40% by weight $HNO_3$) and dilution water in the top tray of the absorber tower. Use of the process of the invention involves diverting the dilution water flow and most of the bleached product acid feed to the second tray from the top of the absorber. In the top tray bleached product acid and concentrated hydrogen peroxide is added to achieve the concentration of $HNO_3$ and $H_2O_2$ specified for this process. A small amount of the solution in the top tray is allowed to drain into the second tray, while $H_2O_2$ and $HNO_3$ is added to maintain the solution in the top tray at the requisite concentrations of $H_2O_2$ and $HNO_3$.

In an extended absorber or gas scrubber use of the herein process entails circulating a mixture containing the specified concentrations of $HNO_3$ and $H_2O_2$ in the extended absorber or gas scrubber. A small amount of this solution can be drawn off continuously and concentrated $HNO_3$ and concentrated $H_2O_2$ added continuously to maintain the scrubbing solution's concentration of $HNO_3$ and $H_2O_2$ in the specified ranges. In manufacturing batch and process streams containing high strength nitric acid (at least 35% $HNO_3$ by weight) a small amount of concentrated $H_2O_2$ is added to the process stream to form a solution containing $HNO_3$ and $H_2O_2$ in the specified ranges. This would prevent the evolution of $NO_x$ due to the oxidation in place of dissolved $N_2O_4$ and $HONO$ to nitric acid.

The invention is illustrated in greater detail by the following non-limiting examples.

Procedure for the Examples

Nitrogen gas, saturated with water vapor and containing specified levels of NO and $NO_2$, is passed through a 500 ml gas washing bottle containing 300 ml of the scrubbing solution. Gas/liquid contact time is approximately two seconds; concentration of NO and $NO_2$ prior to and after scrubbing are determined using a Thermo Election Chemiluminescent Model 10A $NO_x$ Analyzer. The results of carrying out examples in accordance with the procedures aforesaid are summarized in Table I.

Procedure for the Prior Art

The procedure for carrying out the examples of the invention was followed but modified to test the effects in $NO_x$ emission of $H_2O_2$ and nitric acid alone and in combination as described in the previously discussed Japanese and U.S. Patents. The results are summarized in Table II. As is readily apparent from an inspection of the tables, the process of the invention is highly effective in reducing low level $NO_x$ emissions whereas the prior art processes virtually leave the input $NO_x$ levels unchanged.

TABLE I

Examples of the Invention

| Parameter | Example No. 1 | 2 | 3 | 4 |
|---|---|---|---|---|
| Wt. % $HNO_3$ in scrubber | 47 | 55 | 47 | 37 |
| Wt. % $H_2O_2$ in scrubber | 0.4 | 1.2 | 0.9 | 23 |
| Temp. °C. | 58 | 35 | 42 | 20 |
| NO parts per million (inlet gas) | 300 | 295 | 295 | 295 |
| $NO_2$ parts per million (inlet gas) | 60 | 50 | 60 | 2 |
| $NO_x$ parts per million (inlet gas) | 360 | 345 | 355 | 297 |
| NO parts per million (effluent) | 140 | 65 | 180 | 100 |
| $NO_2$ parts per million (effluent) | 100 | 165 | 75 | 93 |
| $NO_x$ parts per million (effluent) | 240 | 230 | 255 | 193 |
| $\Delta NO_x$ parts per million | −120 | −115 | −100 | −104 |

TABLE II

Examples Using Prior Art to Reduce $NO_x$ Emissions

| Parameter | Example No. 1 | 2** | 3*** | 4 | 5 |
|---|---|---|---|---|---|
| Composition of Scrubber No. 1 Solution | 22% $HNO_3$ | 17% $HNO_3$ + 0.4% $H_2O_2$ | 40% $HNO_3$ | 68% $HNO_3$ | 50% $H_2O_2$ |
| Composition of Scrubber No. 2 Solution | * | * | 30% $H_2O_2$ | * | * |
| Temp. °C. | 20 | 35 | 20 | 20 | 20 |
| NO parts per million (inlet gas) | 300 | 300 | 225 | 255 | 260 |
| $NO_2$ parts per million (inlet gas) | 55 | 55 | 5 | 0 | 0 |
| $NO_x$ parts per million (inlet gas) | 355 | 355 | 230 | 255 | 260 |
| NO parts per million (effluent) | 275 | 280 | 80 | 75 | 220 |
| $NO_2$ parts per million (effluent) | 45 | 45 | 135 | 305 | 30 |
| $NO_x$ parts per million (effluent) | 320 | 325 | 215 | 380 | 250 |
| $\Delta NO_x$ | −35 | −30 | −15 | +125 | −10 |

*2nd Scrubber Not Employed.
**Japanese Patent No. 48-15766.
***U.S. Pat. No. 3,991,167.

I claim:

1. A process of removing nitrogen oxides from a gaseous mixture comprising contacting the mixture with an aqueous solution of nitric acid having a concentration by weight of from about 35% to about 58% and containing by weight at least 0.001% of hydrogen peroxide whereby the said nitrogen oxides are converted to nitric acid.

2. The process according to claim 1 wherein the concentration of the nitric acid is from about 40% to about 55% by weight and the concentration of the hydrogen peroxide is from about 0.4% to about 2.0% by weight.

3. The process according to claim 2 wherein the contacting temperature is from about 30° C. to about 60° C.

* * * * *